Feb. 14, 1933.  C. C. COON  1,897,466

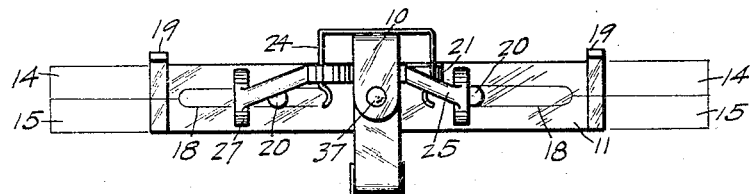
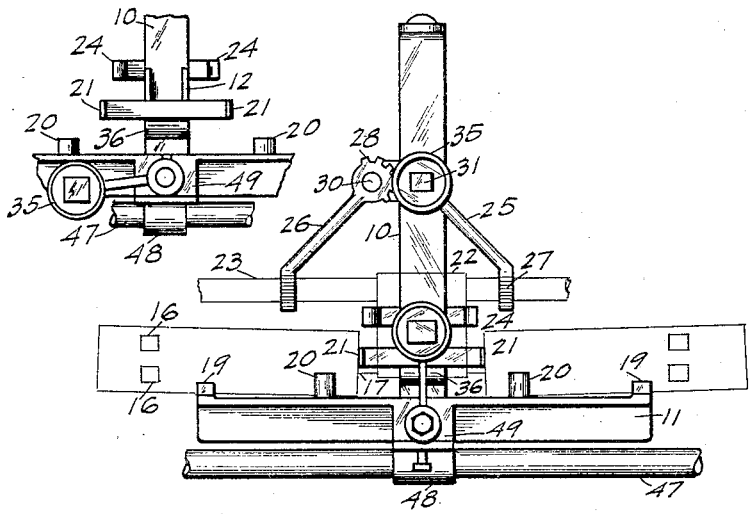
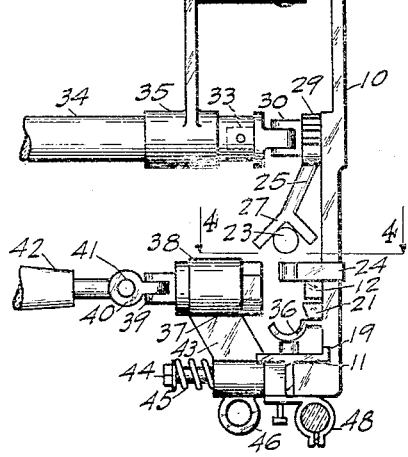

VIBRATION DAMPENER APPLICATOR

Filed Aug. 21, 1931  2 Sheets-Sheet 2

INVENTOR.
Chester C. Coon
BY
Harry J. Schroeder
ATTORNEYS.

Patented Feb. 14, 1933

1,897,466

UNITED STATES PATENT OFFICE

CHESTER C. COON, OF OAKLAND, CALIFORNIA

VIBRATION DAMPENER APPLICATOR

Application filed August 21, 1931. Serial No. 558,497.

This invention is a vibration dampener applicator and remover and has special reference to a tool designed for the purpose of safely applying to or removing from high tension transmission lines, vibration dampeners of the flexibly hung weight type, which are secured to the transmission line by means of a clamp.

The main object of the invention is to provide a tool by means of which a vibration dampener may be secured to a transmission line without danger of shock to the operator.

Another object of the invention is to provide a device which may be hoisted to the transmission line and on which the dampener is removably carried, and which may be positioned thereby and secured to the line.

A further object of the invention is to provide a device as outlined with remote operating means of insulating material for positioning the dampener and for tightening the clamp bolt for securing the dampener to the line, and also adapted by the same means to loosen the clamp bolt and remove the dampener from the line.

A still further object of the invention is to provide a device as outlined with measuring and positioning means for the dampener.

Other objects and advantages of the invention will become apparent as the following description is read on the drawings forming a part of this specification and in which similar reference characters are used to designate similar parts through the several views and in which:

Fig. 1 is a top plan view of the invention showing a vibration dampener in position indicated in light lines.

Fig. 2 is a front elevation of the invention positioned for applying a dampener to a transmission line, the dampener and transmission line being indicated in light lines.

Fig. 3 is a side elevation of the invention.

Fig. 4 is a section taken on line 4—4 of Fig. 3.

Fig. 5 is a fragmentary view showing the socket folded down for removal of the applicator.

Figure 6:
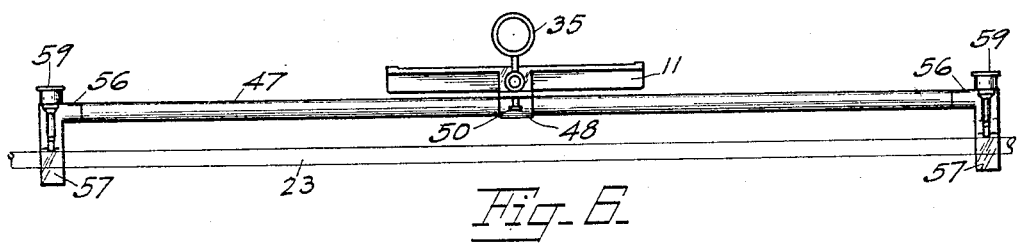
Fig. 6 is a front elevation of the measuring bar for measuring and positioning the dampener a measured distance from the strain insulator.
Figures 7, 8:
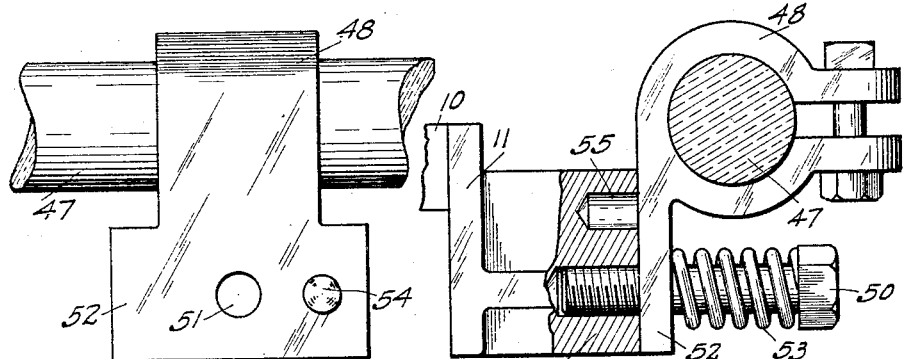
Fig. 7 is a plan view of the measuring bar clamp and a fragmentary view of the measuring bar.
Fig. 8 is an end view of the clamp and its connection to the applicator base.
Figure 9:
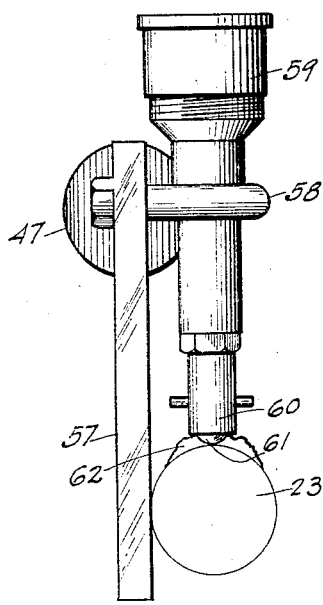
Fig. 9 is a side elevation of one of the markers showing also the measuring bar and transmission line.

The invention consists of a frame consisting of a standard 10 having an integral dampener support 11, and bolt head retaining wings 12. A positioning notch 13 is formed in the front edge of the support 11 for positioning the socket arm.

The dampener consists of a pair of weights, each weight consisting of two members 14 and 15, clamped together by means of a pair of bolts 16 and clamping there between a section of cable 17 which resiliently connects the two weights. A slot 18 is formed between the two members and clears the cable so the cable is only secured in the outer portion of the weights. This dampener does not form a part of the invention.

The dampener support is provided with lugs on one side as indicated at 19 and a pair of dowels 20 which cooperate with the slots 18 for retaining the weights in position while hoisting to the transmission line.

Weight spacing members 21 space the weights centrally relative to the clamp 22 which cooperates with both, the dampener cable 17 and transmission line 23, being clamped to both by an interposed bolt, and being secured to the standard 10 as indicated.

Spring fingers 24, are secured to the standard 10 and resiliently cooperate between the two clamp elements to separate them so the clamp may be passed over in cooperative relation with the line 23.

The lifting device for lifting the dampener in proper position whereby the dampener may be clamped to the line 23 consists of a pair of arms 25 and 26, the ends of which are formed as at 27 to cooperate with the line 23, the arms being integral with the gears 28 and 29 and pivotally mounted at 30 and 31, the gears intermeshing and coincidently swinging both arms through an equal but opposite angle.

Gear 29 has a knuckle joint 30 secured thereto, and a tang 33 is integral with the knuckle joint for securing a pole or handle 34 of insulating material for operation of the device.

A bearing 35 is pivotally supported by a horizontal extension 36' at the top of the standard, the pivot 37 being in vertical alignment with the knuckle joint 30 to permit swinging of the handle 34 through an arc, the bearing 35 being in horizontal axial registry with the gear 29.

A clamp support 36 is disposed in alignment with the dowels 20 and apex of forks 27 so as to align with the transmission line 23.

The wrench for tightening the clamp bolt consists of a socket 37 pivotally and slidably mounted in a bearing 38 and having a knuckle joint 39 secured thereto, the knuckle having a tang 40 with an aperture 41 for cooperation with a hook at the end of an insulated handle 42. The bearing 38 is integral with a bracket 43, which is slidably and pivotally mounted on a bolt or pin 44 and resiliently urged to cooperate with the slot 13 by means of a spring 45, a ring 46 permitting the use of the hook on handle 42 for retracting the wrench and turning it to operative or inoperative position.

The measuring arm consists of a bar 47 mounted in a clamp 48 and which is pivotally mounted on a boss 49 on the base member 11 by means of a bolt 50 passing through an aperture 51 in the base plate 52 of the clamp 48, and resiliently urged in position either longitudinally or transversely of the base 11, by means of a spring 53 and positioned by a dowel 54 which cooperates with either or two apertures 55 formed in the boss 49.

The ends of bar 47 are fitted with ferrules 56 having a plate 57 integral therewith. Secured to each plate 57 by means of a U bolt 58 is a grease cup 59 having an "alemite" fitting 60 secured at the lower end, the "alemite" fitting having a ball valve 61 protruding slightly from the bottom.

The device is used as follows: A clamp is attached to the handle 34 at a point at which the entire device including the dampener are balanced, and the handle 42 is supported by a sling from handle 34. Block and tackle cooperate with the clamp on handle 34 and with a support above the transmission line to which the dampener is to be attached.

The dampener is placed on the device as shown in Figs. 1 and 2, being retained in position by the fingers 21 and dowels 20, the dampener securing clamp 22 resting in the support 36 and being spread by the fingers 24.

The clamp bolt head is disposed between the wings 12 and the socket is turned to the position shown in Fig. 5. The device is then hoisted to the transmission line 23, with arms 25 and 26 turned to their uppermost position.

The device is then hoisted above the transmission line as indicated in Fig. 6, then drawn forward until the plates 57 rest against the side of the line 23, one end of arm 47 or one plate 57 being drawn against the strain insulator, the device is then lowered onto the line which presses the ball 61 back permitting a grease or marking fluid to automatically escape onto the line as indicated at 62, which provides a marker a definite distance from the strain insulator. Additional spacing may be made by moving the device outward and having the first end or plate coincide with the first mark.

The device is then backed and lowered, and drawn forward with the line 23 passing between the bosses 35 and 38 or base 11 and the forks 27 brought in line with line 23.

The arm or handle 34 is then rotated to bring the forks 27 on top of line 23, then rotated further to raise the device to where the clamp 22 properly cooperates with the line. The hooked end of handle 42 is then inserted in the ring 46 and bracket 43 is drawn outwardly and turned to the position shown in Fig. 2. The hook is then removed and inserted through the aperture 41 and forced in over the clamp nut and rotated to draw up the nut, coincidently clamping both, the cable 17 and line 23 securing the dampener to the transmission line.

The bracket is then drawn back and turned to the position shown in Fig. 5 and arms 25 and 26 are released, the device being then swung clear of the transmission line and lowered.

To remove the dampener, the base 11 is brought underneath the weights and the forks over the transmission line, the forks are then turned to raise the weights and allow registry of the socket 37 and wings 12, the clamp resting in seat 36 and the clamp bolt is loosened sufficiently to release the clamp from the line.

The dampener will be retained on the base and is then lowered with the device.

Having described an operable method of constructing and using the invention it will be noted that variations in construction and arrangement of parts which are consistent with the appended claims may be resorted to without detracting from the spirit or scope of the invention or sacrificing any of the advantages thereof.

I claim:

1. In combination, supporting means adapted to position and removably retain a vibration dampener having clamping means thereon, gear actuating lifting means for said supporting means cooperating with a transmission line for engaging the clamp of said dampener to said transmission line, and means for tightening said clamping means.

2. In combination, supporting means adapted to position and removably retain a vibration dampener having clamping means thereon, means cooperating with a transmission line for raising said supporting means into clamp cooperative relation to said line, and means for tightening said clamping means.

3. In combination, supporting means adapted to position and removably retain a vibration dampener having clamping means thereon, remotely controlled lifting arms adapted to cooperate with a transmission line for causing said clamping means to engage the transmission line and means for tightening said clamping means.

4. In combination, supporting means adapted to position and removably retain a vibration dampener having clamping means thereon, remotely controlled means for raising said supporting means to cause said clamp to engage a transmission line, and remotely controlled means for tightening the clamping means.

5. In combination, supporting means adapted to position and removably retain a vibration dampener having clamping means thereon cooperating with a transmission line for raising said supporting means into clamp cooperative relation to said line, means for tightening said clamping means, and means for locating and marking the proper position for the clamping means on said line.

6. In combination, supporting means adapted to position and removably retain a vibration dampener thereon cooperating with a transmission line for raising said supporting means into clamp cooperative relation to said line, resilient means for spreading said clamping means to receive said line and means for tightening said clamping means.

7. In combination, means adapted to cooperate with a transmission line, said means providing marks at predetermined distances on said transmission line, said means also removably retaining a vibration dampener thereon, means for engaging the clamp of said dampener to said transmission line and means for tightening said clamp.

8. For operation with a vibration dampener having a clamp and clamp bolt, supporting means provided with positioning and retaining means for the vibration dampener, and supporting means, positioning means, and spreading means for the vibration dampener clamp, holding means for the clamp bolt head and means for tightening the nut.

9. For operation with a vibration dampener having a clamp and a clamp bolt; supporting means provided with positioning and retaining means for the dampener, and supporting means, positioning means and spreading means for the vibration dampener clamp, holding means for the clamp bolt head, means for tightening the nut, and lifting means cooperating with a transmission line for raising the supporting means to cause the spread clamp to engage the transmission line.

10. For operation with a transmission line and a vibration dampener having a clamp and a clamp bolt; supporting means provided with positioning and retaining means for the dampener, and supporting means, positioning means and spreading means for the clamp, holding means for the clamp bolt head, means for tightening the nut, lifting means cooperating with the transmission line for raising the dampener supporting means in clamp engaging relation with the transmission line and marking means for locating the position at which the clamp is to be applied on the line.

11. In combination, vibration dampener supporting means provided with positioning and retaining means; vibration dampener clamp supporting means, positioning means and spreading means; clamp bolt holding means, and nut tightening means.

12. In combination, vibration dampener supporting means provided with positioning and retaining means; vibration dampener clamp supporting means, positioning means and spreading means, clamp bolt holding means, nut tightening means, and marking means for locating the point for attachment of the clamp to a transmission line.

13. In combination with a vibration dampener applicator: marking means for locating the position at which the dampener clamp is to be applied on a transmission line.

14. In combination with a vibration dampener applicator; clamp positioning means and clamp spreading means to permit passage of the dampener clamp over a transmission line.

15. In combination with a vibration dampener applicator having means for spreading the dampener clamp: lifting means cooperating with a transmission line for raising the applicator to cause the spread clamp to engage the transmission line.

In testimony whereof I affix my signature.

CHESTER C. COON.